United States Patent [19]

Wright

[11] 4,419,833

[45] Dec. 13, 1983

[54] COMPOSITE LEVEL CONSTRUCTION

[76] Inventor: Randall J. Wright, 9150 W. Hawthorne, Milwaukee, Wis. 53226

[21] Appl. No.: 460,160

[22] Filed: Jan. 24, 1983

[51] Int. Cl.$^3$ ............................................... G01C 9/32
[52] U.S. Cl. ..................................... 33/379; 33/381; 33/389
[58] Field of Search ................ 33/379, 377, 365, 381, 33/380, 389

[56] References Cited

U.S. PATENT DOCUMENTS

| | | | |
|---|---|---|---|
| 3,029,524 | 4/1962 | Vaida et al. | 33/381 |
| 3,835,549 | 9/1974 | De Jong et al. | 33/379 |
| 4,011,660 | 3/1977 | Johnson | 33/379 |
| 4,208,803 | 6/1980 | Brown et al. | 33/379 |

Primary Examiner—Willis Little
Attorney, Agent, or Firm—McDougall, Hersh & Scott

[57] ABSTRACT

A level or pitch measuring instrument of composite metal and plastic construction. A metal frame or base of T-shaped cross-section includes a first planar working surface and an upstanding web portion. Means are provided for mounting vials in the web in precise preselected angular relationship to the planar working surface. A plastic second planar working surface element is assembled to the frame or base to maintain preselected axial alignment of the vials with the plane of the web. Simultaneously, the vial orientation on the frame or base will permit coaction of metal and plastic elements to position the plastic planar working surface in a predetermined relationship to the metal planar working surface. Openings are provided in the plastic and metal elements to permit lateral vial viewing through the web and vertical viewing of plural vials through the plastic working surface.

10 Claims, 7 Drawing Figures

U.S. Patent  Dec. 13, 1983  4,419,833
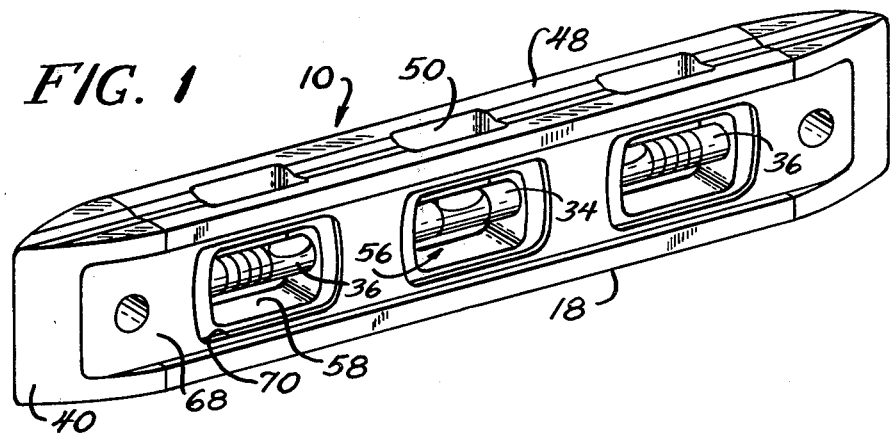
FIG. 1
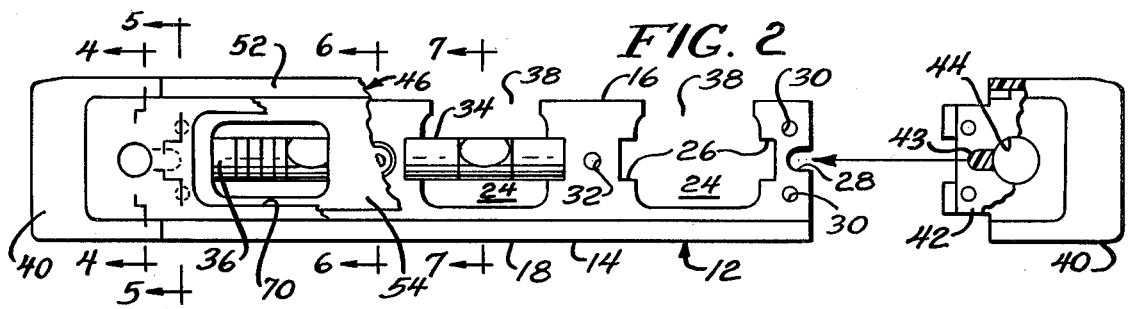
FIG. 2
FIG. 3
FIG. 4  FIG. 5  FIG. 6  FIG. 7

COMPOSITE LEVEL CONSTRUCTION

This invention pertains to a precision measuring instrument for determing level or pitch relationships and, more particularly, to a level instrument having measuring vials contained within a composite metal and plastic frame.

Level instruments of all wood, metal or plastic frame construction are well known to the trade. However, for economic and manufacturing reasons modern levels are generally fabricated from either metal or plastic. For example, Wright, U.S. Pat. No. 3,311,990, discloses an all metal I-beam frame having opposed parallel working surfaces spaced apart by a web structure with openings therein to receive and precisely align level vials with respect to these parallel working surfaces. The intrinsic rigidity of the metal frame produces a highly accurate long life instrument resistant to major inaccuracies caused by minor damage during normal usage.

Vaida, U.S. Pat. No. 4,109,392, represents a level of all plastic construction. Levels of this type clearly may be manufactured but are unacceptable to many skilled artisans and tradesmen due to cheap construction, inaccuracy, likelihood of damage and bubble misalignment during normal use. Thus, the use of metal frame construction is preferred for those seeking long lasting and high quality level instruments.

The provision of a viewing opening or aperture through at least one of the working surfaces to enable the user to read the level instrument from above, below and from the side has become an important feature to level instrument users, and a need has developed for top or bottom viewing of plural vials. An example of this construction is shown in the above Vaida '392 patent. However, in manufacturing practice, it has been found to be both difficult and costly to provide even a single opening through level working surfaces and web portions of typical I-beam metal frames to provide the top or bottom viewing feature. The cost becomes prohibitive where more than a single such arrangement is attempted. Injection molded plastic level frames, by contrast, may less expensively be molded with top surface viewing windows and without secondary machinery operations.

The level instrument of the present invention includes a frame of composite metal-plastic construction utilizing many of the advantages and benefits of both metal and plastic fabrication techniques. In particular, a metallic lower working surface and web structure is provided for level rigidity and accuracy assurance while eliminating all metal above the vial openings. Mating the metal element with molded plastics above the vial openings permits visual sighting of plural vials from above or below depending on positioning of the level. The combination of plastic elements with a rigid metal base structure permits the relatively wide ranging variation of level aesthetics to appeal to a broad spectrum of end users.

Opposed vial receiving slots are punched into the web portion of the base or frame in a manner similar to that shown in Wright, U.S. Pat. No. 3,311,990, to facilitate installation and accurate positioning of the vials with respect to the metal bottom working surface without need for time consuming vial calibration or adjustment by skilled labor. The top working surface elements of this level instrument are fabricated from injection molded plastic with the viewing apertures preformed therein. The elements are mated to the metal base in a manner obviating calibration or adjustment of the plastic elements relative to the base or the measuring axis defined by the vials. Thus, neither expensive additional fabrication nor calibration steps are required in the final assembly of the composite level instrument of the invention.

Of considerable importance in all quality level instruments is the proper and accurate alignment of the level vial with both the metal and plastic working surfaces and maintenance of such alignment. As discussed above, the vials are automatically and accurately aligned with respect to the lower metallic working surface by virtue of the positioning notches punched in the web generally in the manner taught in Wright U.S. Pat. No. 3,311,990. However, the invention involves several material departures from the '990 frame fabrication technique. In particular, it has been found, when using an extruded metal frame blank to produce the lower working surface and multi-vial receiving web structure, that a stress relieved blank is preferred to obviate distortion during hole punching or blanking operations. In addition, the vial orientation on the web of the frame is keyed directly to the plane of the underlying working surface in a manner eliminating subsequent machining steps.

This invention provides a composite plastic-metal level assembly wherein the plastic upper working surface and vials are automatically aligned. One alignment technique of the invention includes the provision of opposed vial receiving slots in the plastic member which engage the vial mounted in the metal web structure thereby properly aligning the upper plastic working surface with respect to the rigidly mounted vials. In an alternative embodiment, the upper working surface can be keyed to end plates which are, in turn, accurately positioned with respect to the metallic web by alignment notches punched in the metal web concurrently with the vial alignment and retention notches. In this manner, precise alignment of the working surface of a plastic element with respect to the vials in the metallic web is assured.

FIG. 1 is a perspective view of the composite level instrument of this invention;

FIG. 2 is a front elevation view of the composite level instrument of FIG. 1 having portions broken away to reveal the metal level frame with vial openings and mounting notches therein, the righthand end cap is shown removed to show the indexing notch therefor;

FIG. 3 is a plan view of the composite level of FIG. 1 illustrating the top viewing feature of the composite construction; portions are broken away to show the frame and end cap mounting;

FIG. 4 is a sectional view taken along line 4—4 of FIG. 2 illustrating the engagement and alignment of the cover plates and end caps;

FIG. 5 is a sectional view taken along line 5—5 of FIG. 2 illustrating the indexing and retention of the end cap to the web;

FIG. 6 is a sectional view taken along line 6—6 of FIG. 2 illustrating the engagement and alignment of the rail pieces and cover plates; and, FIG. 7 is a sectional view along line 7—7 of FIG. 2 illustrating the relationship between the vials, metal frame, plastic rail pieces, cover plates including, in particular, the semi-circular alignment recesses;

Referring to the Figures, the level instrument of this invention, shown generally at 10, includes a metal frame element 12 having a generally T-shaped cross-section formed by a lower rail 14 and an upstanding or perpendicular web 16. The bottom surface of rail 14 may provide a planar lower working surface 18, FIGS. 1, 2, and 5, or it may provide a channel 20 as shown in FIGS. 6 and 7 to receive a planar magnetic rubberized strip 22.

It has been found, in the development of the invention, that when the relatively large, generally C-shaped vial receiving openings 24, best seen in FIG. 2, are punched out of the web material of the original blank, unacceptable distortion of the punched frame 12 may result. Such distortion, where correctable, necessarily involves additional and costly manufacturing steps. To obviate stress induced distortion, frame 12 is preferably fabricated from an extruded aluminum blank which has been treated to significantly reduce or eliminate stress produced distortions, e.g. Reynolds 6063-T6 extruded aluminum, or similar rigid, though workable lightweight material. During fabrication of metal frame element 12, other holes and slots are preferably punched in the web 16 simultaneously with openings 24 to facilitate accurate instrument assembly. These variously include vial receiving notches 26 disposed across openings 24, end cap indexing slots 28 and rivet holes 30 as well as cover securement holes 32 as best seen in FIG. 2.

The planar working surface, either 18 or 22, are oriented to vial receiving slots 26 in a manner such that vial insertion automatically provides a predetermined level measuring relationship between vial and working surface. No further machining or fabrication steps are necessary to achieve this.

In one embodiment of the invention, a conventional cylindrical level vial 34 is positioned in the center opening 24, while pitch vials 36, of the type disclosed by applicant in copending U.S. patent application, Ser. No. 222,611, filed on Jan. 5, 1981, are positioned in opposed relationship in each of the C-shaped end openings 24 to permit both positive and negative pitch measuring. It will be appreciated, as illustrated in FIG. 2, that there is no web material in the region 38 directly above each vial as contrasted with conventional I-beam metal levels in which the metallic upper rail normally blocks visual sighting of the vial from the top. FIG. 3 best illustrates vial orientation for top viewing.

Molded plastic end caps 40 include spaced parallel lips 42 to receive and position web 16 therebetween. As described in applicant's copending U.S. patent application, Ser. No. 430,790, filed on Sept. 30, 1982, a ridge 43 integrally formed between lips 42 engages slot 28 as the end cap is mated to the web. This serves to precisely align the end cap with respect to frame 12, generally, and to the vials 34, 36 and the lower working surface 18, specifically. Each end cap is permanently attached to the web by a pair of rivets 45 through holes 30. Holes 44 in each end cap function as a convenient means of hanging the level instrument when not in use and, as discussed below, may be used to align the plastic upper working surface with the vials.

As best shown in FIGS. 6 and 7, a pair of molded plastic upper rail members 46 are mated about and bridge web 16 and define the upper working surface 48 of the level instrument 10 of the invention. The use of molded plastic elements to provide the upper working surface 48 in a level instrument having a metal frame element 12 or skeleton produces several significant advantages over prior art all metal constructions. For instance, lower overall weight and material costs can be obtained without materially compromising the structural rigidity or integrity commonly associated with all metal constructions. The use of a composite construction provides aesthetic combinations of materials which are unattainable with only a single material. Further, conventional injection molding techniques can be employed to create viewing openings 50 in the plastic upper working surface of the instrument. Such 'top viewing' has become increasingly popular in most trades utilizing level instruments but has heretofore required complex and costly machining operations in metal frame level constructions. The composite instrument of the invention provides top viewing but obviates expensive metal machining operations while maintaining the overall integrity and accuracy of metal levels.

The plastic rail members 46 comprise integrally molded opposed rails 52 and opposed rail supports 54 which extend downwardly therefrom. Rails 52 define the upper plastic working surface 48 while supports 54 bridge the metal web 16 and, as more fully described below, serve to align and retain the rail and upper working surface in preselected relationship to the metal web 16 and the vials 34 and 36 rigidly fixed therein.

As best illustrated in FIGS. 1 and 7, opposed rail supports 54 include generally rectangular opposed vial side viewing windows 56 defined by ridges or walls 58 around the perimeter of each viewing opening and extending inwardly therefrom. The walls 58 provided by the plastic upper rail members 46 are adapted for abutting contact within web openings 24. A pair of opposed semi-circular recesses 60 are provided in opposed sides of each wall 58 to receive vials 34 and 36. It will be appreciated that walls 58 with recesses 60 therein serve to automatically axially align and retain the vials within the plane defined by web 16 when assembled. As will be discussed in more detail below, when the recesses 60 of walls 58 overlie a vial on frame 12 they may additionally serve to automatically align the upper working surface to the vials when assembled as necessary for accurate level measurement utilizing that surface.

Rail supports 54 also include a pair of inwardly extending cover receiving bosses 62, FIG. 6, which form opposed abutting contact elements against web 16. The bosses 62 are designed to receive overlying cover mounting bosses 64 and level assembly screws 66 (FIG. 6). These bosses are also designed for opposed abutting contact with web 16. As described more fully below, bosses 62 may serve to align the upper plastic working surface in predetermined relationship to the vials.

A pair of opposed cover plates 68 overlie the rail supports 54 of each plastic rail member 46. Cover plates and rail members are preferably molded of differing colors, for example black and white, respectively, to provide an aesthetically pleasing contrast. Otherwise, these pieces may be combined and molded as single members. In addition to their decorative function, cover plates 68 may serve as interface elements between the rail members 46 and the end caps 40 to align the plastic working surface 48 to the vials, discussed below.

Conventional all metal levels are typically fabricated from extruded aluminum or similar material of "I" shaped cross-section which defines generally parallel and opposed upper and lower working surfaces. These surfaces may be milled if desired to achieve improved parallelism and accuracy. A principal advantage of such prior art all-metal level constructions is the relative simplicity of vial alignment whereby means must be provided for alignment of the vial with only one of the working surfaces. Alignment with the other working surface follows automatically by reason of the fixed parallel relationship of the opposed working surfaces inherent in all metal I-beam constructions.

It can be appreciated that the composite plastic-metal level instrument of this invention will automatically achieve measuring alignment between the plastic working surface and the level or pitch vials following assembly without calibration of the vials. Two alternative arrangements are contemplated and shown herein to achieve this automatic orientation.

As best shown in FIG. 7, a direct indexing of the plastic working surface 48 to the level vials premounted in frame 12 is facilitated by vial engaging recesses 60 dimensioned to tightly receive the level vials therein. The recesses are molded, as an integral part of rail members 46, in precise predetermined relationship with respect to the plastic working surface thereby assuring the proper alignment between the pre-mounted vials and the working surface 48.

In an alternative and indirect arrangement for aligning the plastic upper working surface 48 to the vials, vial engaging recesses 60 are dimensioned to loosely receive the level vials in order to preclude interference between the vials and recesses during level instrument assembly. Actual alignment of the rail members 46 and working surface 48 to the vials is achieved indirectly but automatically by cover plates 68 and end caps 40. Specifically, cover plates 68 are interposed between and serve to accurately position the rail members 46 in predetermined relationship to end caps 40 which, as noted above, are indexed and retained in predetermined relationship with respect to web 16. Since the vial positioning notches 26 and the end cap indexing slots 28 are precision punched into web 16, a predetermined assembly geometry is created between the end caps and vials when secured to frame 12. In this manner the plastic working surface may be accurately positioned in relation to the level frame and vials.

A preferred arrangement for opposed cover plates 68 to achieve the above indirect alignment is shown in FIGS. 4 and 6 wherein the cover plates each include spaced inwardly facing end cap engaging boss elements 72 (FIGS. 4 and 5) and a second spaced inwardly facing and rail support 54 engaging bosses 64 (FIG. 6) which also engage web 16. Each of the boss pairs 72 and 64 is dimensioned to be snugly received within respective corresponding openings provided in end caps 40 and rail supports 54. Thus, end cap engaging bosses 72 are retained in fixed relationship within end cap holes 44 while rail support engaging bosses 64 are similarly held in a fixed position within rail support bosses 62. The engagement of rail member 46 by the two cover plate bosses 64 precludes all relative movement between these members and establishes the requisite predetermined angular relationship therebetween. In similar manner, cover plates 68 are retained in fixed and predetermined angular relationship with respect to the end caps and, in turn, the vials.

It will be appreciated that the use of bosses on the cover plates merely represents a preferred arrangement to index and align the cover plates. Other cover indexing means are contemplated by this invention including for example posts, flanges, or tabs.

I claim:

1. An instrument for determining level or pitch relationships comprising:
   (a) a level or pitch vial;
   (b) a metal frame having a first planar working surface and an upstanding web, the web including means for positioning and for retaining the vial in a predetermined angular relationship with respect to the first planar working surface;
   (c) a plastic element having a second planar working surface parallel to said first working surface and spaced therefrom; and
   (d) means for automatically aligning the plastic element and the plastic second planar working surface in a predetermined angular relationship with respect to the vial, said means including a plastic web engaging portion extending downwardly from said second working surface and bridging the upstanding web.

2. The instrument of claim 1 wherein openings are provided in the web and in the plastic element to permit viewing of the vial through the plastic second planar working surface.

3. The instrument of claim 1 wherein the plastic element comprises a means for retaining the vial against displacement in one direction.

4. The instrument of claim 1 wherein the plastic element is comprised of two generally symmetric members each having a rail portion and said web engaging portion, the plastic members symmetrically disposed in opposed relationship about the web engaging and retaining the web therebetween, the web engaging portions with the rail portions of the plastic members coacting to form the second plastic planar working surface above the web and automatically oriented to the vial.

5. The instrument of claim 4 in which the web engaging portions include means for engaging the vial whereby the plastic second planar working surface is maintained in a predetermined second angular relationship with respect to the vial.

6. The instrument of claim 1 wherein the vial is cylindrical; the plastic element comprising two coacting members, each member having recess means oriented in predetermined relationship to the second working surface and disposed in engagement with the vial on opposite sides of the upstanding web thereby aligning the plastic second planar working surface in a second angular relationship with respect to the vial and simultaneously aligning the vial axis with the plane of the web.

7. The instrument of claim 1 wherein the means for aligning the plastic second working surface in the predetermined second angular relationship to the vial includes means for aligning said plastic second working surface in a predetermined third angular relationship with respect to the first working surface, the first and third predetermined angles defining the second predetermined angular relationship.

8. An instrument for determining level or pitch relationships comprising:
   (a) a level or pitch vial;
   (b) a metal frame having a first planar working surface and an upstanding web, the web including means for positioning and for retaining the vial in a predetermined angular relationship with respect to the first planar working surface;
   (c) a plastic element having a second planar working surface; and
   (d) means for automatically aligning the plastic element and the plastic second planar working surface in a predetermined angular relationship with respect to the vial, wherein the means for aligning the plastic second working surface in the predetermined second angular relationship to the vial includes means for aligning said plastic second working surface in a predetermined third angular relationship with respect to the first working surface, the first and third predetermined angles defining the second predetermined angular relationship and wherein the means for aligning the plastic second working surface in third predetermined angular relation-ship includes level instrument end caps secured to the ends of the frame in predetermined relationship with respect to the first working surface, means positioning the plastic second working surface in predetermined relationship with respect to the end caps.

9. The instrument of claim 8 wherein the means positioning the plastic second working surface includes cover means interposed between the plastic means and the end caps, the cover means including means engaging and positioning the cover means in precise relationship to the plastic means and end caps.

10. The instrument of claim 9 wherein the means engaging and positioning the cover means in precise relationship to the plastic means includes bosses on the cover means adapted to be snugly received in openings in the end caps and plastic means.

* * * * *